E. T. STARR,

Assignor to S. S. WHITE.

Adjustable-Bracket.

No. 8,723. Reissued May 20, 1879.

WITNESSES

Wm. A. Skinkle.

Geo W Breck

INVENTOR

Eli T. Starr.

By his Attorneys

Baldwin, Hopkins & Peyton

N. PETERS, PHOTO-LITHOGRAPHER, WASHINGTON, D. C.

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN ADJUSTABLE BRACKETS.

Specification forming part of Letters Patent No. 169,382, dated November 2, 1875; Reissue No. 8,723, dated May 20, 1879; application filed March 7, 1879.

*To all whom it may concern:*

Be it known that I, ELI T. STARR, of the city and county of Philadelphia, in the State of Pennsylvania, have invented certain new and useful Improvements in Adjustable Brackets, of which the following is a specification.

My invention relates to that class of brackets capable of both vertical and lateral adjustment; and its objects are to maintain the tray or table supported by the bracket always in a horizontal position, to render the tray adjustable on the bracket, and to render the bracket self-locking in any position to which it may be adjusted vertically.

My invention consists of certain new combinations of devices, which are recited at the close of this specification.

Figure 1:
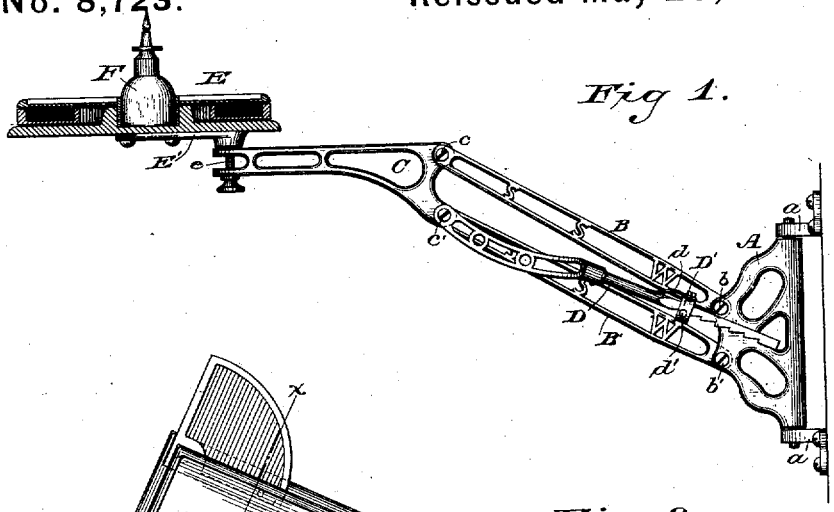
Figure 2:
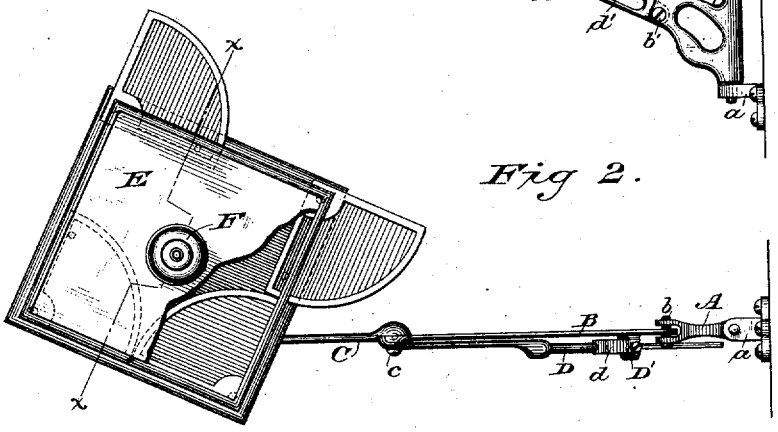
Figure 3:
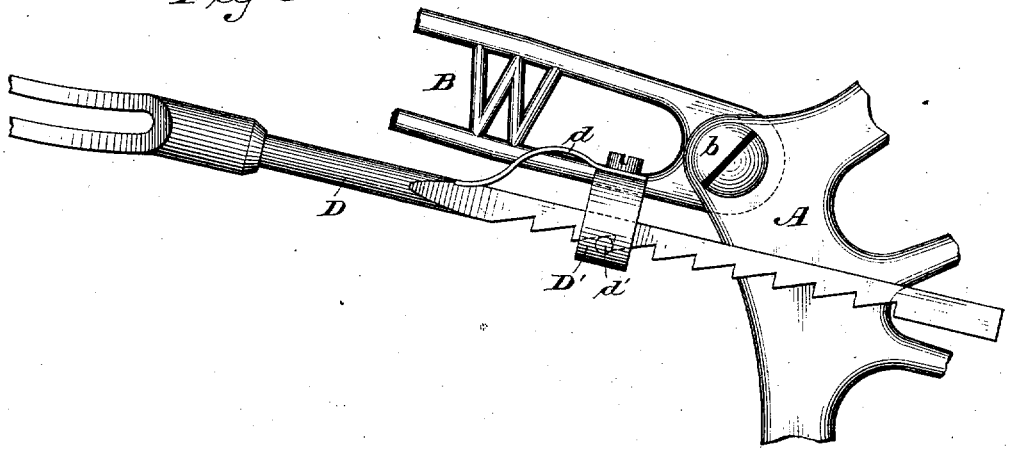

In the accompanying drawings, Figure 1 represents a view of my improved bracket and table, partly in elevation and partly in section, on the line *x x* of Fig. 2. Fig. 2 represents a plan or top view of the same, with a portion of the top of the table broken away, and some of the drawers of the table drawn out to show their construction, and Fig. 3 a view, on an enlarged scale, of the locking device of the bracket.

To a back plate or crane, A, pivoted to swing horizontally in suitable bearings *a a*, affixed to the wall or some other support or permanent structure, two parallel arms or radius-bars, B B′, are pin-jointed at *b b′*, while their opposite ends are, in like manner, pin-jointed at *c c′* to a horizontal frame or arm, C, thus forming a parallel-rule joint, which keeps the bar or frame C always level while capable of moving freely vertically. The bracket is held at any desired elevation by means of an automatic locking device, consisting of a locking-bar, D, hinged on the lower pivot, *c′*, of the horizontal bar, and extending across to the rear joint of the upper bar, B.

The free end of the locking-bar is provided with ratchet-teeth, and is capable of sliding endwise through a loop or support, D′, secured upon the upper radius-bar, B. A spring, *d*, serves to keep the ratchet-teeth engaged with the locking pin or tooth *d′* of the loop, said pin being arranged therein.

The ratchet-teeth of the locking-bar, it will be observed, are shown as arranged in a direction the reverse of the obvious one, or the one that would most naturally suggest itself. This is done, however, for the purpose of sustaining the bracket at any desired elevation by a pulling-strain on the locking-bar instead of a thrusting one, as the pulling-strain in practice has been found to hold the bracket more steadily and securely.

A tray or table, E, is mounted upon a swinging or pivoted support, E′, said table-support being pivoted to the outer end of the horizontal frame C by a pivot, *e*. The table is thus free to swing around a pivot with a wide range of motion. It may be held in any desired position by a suitable catch or locking-cam. Quadrant-shaped drawers are pivoted to each corner of the table, so as to swing out with a circular movement, instead of being made square and pulling out straight, as usual.

By this mode of construction, in addition to the ease in which the drawers may be opened and shut, I am enabled to secure a central space in the table, in which a lamp, F, or other object may be inserted without interfering with the drawers, and yet be securely held without the necessity of employing clamps or fastening.

The operation of my improved apparatus will readily be understood from the foregoing description. As the table is lifted, the locking-bar slides endwise through the loop, and its teeth automatically hold the bracket at any height to which it may be adjusted. The bracket can be lowered simply by lifting the teeth of the locking-bar out of contact with the loop when it draws out endwise. This can readily be done by the operator applying his hand to that portion of the locking-bar nearest the table, and obviates the necessity of the operator moving his position while adjusting the bracket.

It may be well to state that I am aware that adjustable brackets have heretofore been constructed with the crane or pivots, the parallel or equivalent arms, the horizontal frame, a pivoted table, and a set-screw or clamp-nut to lock the table in its vertically-adjusted position; but I am not aware that prior to my invention such a bracket and table had ever been constructed with an automatic or self-locking device to maintain the table in its adjusted position.

I claim as my invention—

1. The combination, substantially as hereinbefore set forth, of the parallel arms, the horizontal frame, the table carried by said frame, and the automatic locking device for retaining the table in its vertically-adjusted position.

2. The combination, substantially as hereinbefore set forth, of the crane, the parallel arms, the horizontal frame, the pivoted or swinging table-support carried by the frame, and the self-locking bar to maintain the horizontal frame in its vertically-adjusted position.

3. The combination, substantially as hereinbefore set forth, of the crane, the parallel arms, the horizontal frame jointed thereto, the table mounted so as to turn freely horizontally upon said frame, and the automatic locking device to maintain the table in its vertically-adjusted position.

4. The combination, substantially as hereinbefore set forth, of the crane, the parallel arms, the horizontal frame, the swinging table carried thereby, the locking-bar for maintaining the said frame in its vertically-adjusted position, and the spring acting upon the bar to render it self-locking.

5. The combination, substantially as hereinbefore set forth, of the crane, the parallel arms, the horizontal frame, and the locking-bar moving endwise through a supporting and guiding loop to lock the frame in its vertically-adjusted position.

ELI T. STARR.

Witnesses:
WM. J. PEYTON,
JOHN F. PARET.